United States Patent
Shibata et al.

(10) Patent No.: US 11,493,912 B2
(45) Date of Patent: Nov. 8, 2022

(54) UNSTEADINESS DETECTION DEVICE, UNSTEADINESS DETECTION SYSTEM AND UNSTEADINESS DETECTION METHOD

(71) Applicant: MITSUBISHI ELECTRIC CORPORATION, Tokyo (JP)

(72) Inventors: Masahiko Shibata, Tokyo (JP); Kengo Shiraki, Tokyo (JP); Daiki Nakahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 397 days.

(21) Appl. No.: 16/621,196

(22) PCT Filed: Jun. 30, 2017

(86) PCT No.: PCT/JP2017/024075
§ 371 (c)(1),
(2) Date: Dec. 10, 2019

(87) PCT Pub. No.: WO2019/003404
PCT Pub. Date: Jan. 3, 2019

(65) Prior Publication Data
US 2020/0264595 A1    Aug. 20, 2020

(51) Int. Cl.
*G05B 23/02* (2006.01)
*G05B 19/418* (2006.01)
(Continued)

(52) U.S. Cl.
CPC ..... *G05B 23/0243* (2013.01); *G05B 19/4184* (2013.01); *G05B 23/024* (2013.01);
(Continued)

(58) Field of Classification Search
CPC ............ G05B 23/0243; G05B 19/4184; G05B 23/024; G06F 11/3055; G06F 11/3447; G06N 20/00
See application file for complete search history.

(56) References Cited

U.S. PATENT DOCUMENTS 5,570,300 A    10/1996 Henry et al.
5,774,378 A    6/1998 Yang
(Continued)

FOREIGN PATENT DOCUMENTS

CN    105787587 A    7/2016
JP    4-140803 A    5/1992
(Continued)

OTHER PUBLICATIONS

Office Action issued in corresponding Korean Patent Application No. 10-2019-7037657 dated Jun. 3, 2020.
(Continued)

*Primary Examiner* — John C Kuan
(74) *Attorney, Agent, or Firm* — Birch, Stewart, Kolasch & Birch, LLP

(57) ABSTRACT

An unsteadiness detection device (30) is provided which is capable of detecting the operation state of facilities using binary digital signals, the unsteadiness detection device including: a model generation unit (313) to generate a normal model for determining operation states of a plurality of facilities (11) on the basis of operation data which are binary digital signals obtained from the facilities (11) in their steady operation states; an expectation value calculation unit (315) to calculate an expectation value of operation data by applying the normal model to past operation data of the facilities (11); and an unsteadiness detection unit (316) to detect whether or not an operation state of one of the facilities (11) is unsteady by comparing the expectation
(Continued)

(a)    (b)

value of the operation data and a measured value of the operation data.

10 Claims, 14 Drawing Sheets

(51) Int. Cl.
  *G06F 11/30* (2006.01)
  *G06N 20/00* (2019.01)
  *G06F 11/34* (2006.01)
(52) U.S. Cl.
  CPC ...... *G06F 11/3055* (2013.01); *G06F 11/3447* (2013.01); *G06N 20/00* (2019.01)

(56) References Cited

U.S. PATENT DOCUMENTS

| | | |
|---|---|---|
| 6,477,485 B1 | 11/2002 | Radulovic et al. |
| 2006/0073013 A1 | 4/2006 | Emigholz et al. |
| 2013/0030555 A1 | 1/2013 | Starr et al. |
| 2014/0279795 A1* | 9/2014 | Shibuya ............. G05B 23/0221 706/46 |
| 2016/0005298 A1 | 1/2016 | Takahashi et al. |
| 2016/0076970 A1* | 3/2016 | Takahashi ............. G06N 20/00 702/33 |
| 2016/0287184 A1 | 10/2016 | Diebold et al. |
| 2017/0031329 A1 | 2/2017 | Inagaki et al. |
| 2018/0231969 A1* | 8/2018 | Noda ..................... G05B 23/02 |
| 2019/0265657 A1 | 8/2019 | Inagaki et al. |
| 2019/0376840 A1 | 12/2019 | Koizumi et al. |

FOREIGN PATENT DOCUMENTS

| | | | |
|---|---|---|---|
| JP | 9-280900 A | 10/1997 | |
| JP | 2000-29513 A | 1/2000 | |
| JP | 2002-215231 A | 7/2002 | |
| JP | 3425148 B2 | 7/2003 | |
| JP | 2005-301582 A | 10/2005 | |
| JP | 2006-343063 A | 12/2006 | |
| JP | 2007-102561 A | 4/2007 | |
| JP | 2008-512800 A | 4/2008 | |
| JP | 2008-226006 A | 9/2008 | |
| JP | 2009-223416 A | 10/2009 | |
| JP | 2012-48405 A | 3/2012 | |
| JP | 2013-33459 A | 2/2013 | |
| JP | 2013025367 A * | 2/2013 | ........... G05B 23/024 |
| JP | 2013-89184 A | 5/2013 | |
| JP | 2014-507721 A | 3/2014 | |
| JP | 2015-197917 A | 11/2015 | |
| JP | 2016-164772 A | 9/2016 | |
| JP | 2017-33526 A | 2/2017 | |
| KR | 10-1659989 B1 | 9/2016 | |
| TW | I569231 B | 2/2017 | |
| WO | WO 2018/150616 A1 | 8/2018 | |

OTHER PUBLICATIONS

Indian Office Action for Indian Application No. 202147007501, dated Feb. 22, 2022, with English translation.
U.S. Appl. No. 17/152,469, filed Jan. 19, 2021.
Indian Office Action for Indian Application No. 201947050929, dated Mar. 4, 2021. with English translation.
International Search Report, dated Nov. 6, 2818, for International Application No. PCT/JP2018/032612, with an English translation.
Japanese Notice of Reasons for Refusal, dated Nov. 24, 2020, for Japanese Application No. 2020-540883, with an English translation.
Shibata et al., "Anomaly Detection Method for Digital Control Input-Output Signals," Proceedings of the 80th National Convention of IPSJ: Computer Systems. Software Science/Engineering, Data and Web. Mar. 22, 2018, pp. 1-157 and 1-158, total 5 pages, with an English translation.
Taiwanese Office Action and Search Report, dated Jan. 15, 2021, for Taiwanese Application No. 108105574, with an English machine translation of the Taiwanese Office Action.
Office Action issued in corresponding Korean Application No. 10-2019-7037657 dated Mar. 5, 2020.
Examination Opinion Notice dated Jan. 23, 2019 of Taiwan Patent Application No. 106130970 corresponding to International Application No. PCT/JP2017/024075 and its partial English translation.
International Search Report for PCT/JP2017/024075 (PCT/ISA/210) dated Sep. 26, 2017.
German Office Action for German Application No. 11 2018 007 863.9 dated Sep. 17, 2021, with English translation.
German Office Action for German Application No. 112018007863.9, dated Mar. 22, 2021, with English translation.
German Office Action for German Application No. 112017007606.4, dated Oct. 8, 2020, with English translation.
German Office Action for German Application No. 1120180070863.9, dated Mar. 22, 2021, with English translation.
Chinese Office Action and Search Report for Chinese Application No. 201880096843.2, dated Apr. 7, 2022, with English translation of Chinese Office Action.
Office Action dated Apr. 8, 2022 in corresponding Chinese Application No. 201780092426.6.
Chinese Office Action for Chinese Application No. 201880096843.2, dated Aug. 2, 2022, with an English translation.
Office Action dated Sep. 5, 2022 in corresponding Chinese Application No. 201780092426.6.

* cited by examiner

| Time | Facility 11a | | Facility 11b | | ⋮ |
|------|----------|----------|----------|----------|---|
|      | Signal 1 | Signal 2 | Signal 1 | Signal 2 |   |
| $t_1$ | 0 | 0 | 0 | 0 | ⋮ |
| $t_2$ | 1 | 0 | 1 | 0 | ⋮ |
| $t_3$ | 0 | 1 | 0 | 0 | ⋮ |
| ... | ... | ... | ... | ... | ⋰ |

UNSTEADINESS DETECTION DEVICE, UNSTEADINESS DETECTION SYSTEM AND UNSTEADINESS DETECTION METHOD

TECHNICAL FIELD

The present invention relates to an unsteadiness detection system for detecting unsteady states of facilities connected in a factory automation system (hereinafter, referred to as the FA system).

BACKGROUND ART

Conventionally, in a site for manufacturing products such as a factory, when a facility having normally operated falls from a steady state to an unsteady state, i.e. for example to a case of stoppage of a manufacturing line, a maintenance worker in charge of the facility of the manufacturing line identifies the cause of the trouble and takes an action such as replacing a part to get rid of the anomaly, restoring a steady operation state of the facility from the unsteady state one.

However, as facilities in a factory get complicated due to for example introduction of an FA system, maintenance workers have to acquire an enormous amount of knowledge and knowhow. In this situation, the maintenance workers with less experience often face difficulties in identifying the cause of an unsteady state. However, it takes a lot of man-hours to perform setting operations for comprehensively identifying the causes of an unsteady state or to develop a program therefor, thus such activities are unrealistic.

To solve the problem mentioned above, Patent Document 1 proposes a method for monitoring a system, in which the operation state of the system is detected using a deviation matrix which is the difference between an empirical transition probability matrix and a current transition probability matrix; the empirical transition probability matrix is a matrix indicating the system's steady state obtained from time-series sensor data collected from a plurality of sensors in the system, and the current transition probability matrix is a matrix obtained from the latest sensor data which are time-series data accumulated for a predetermined period.

PRIOR ART DOCUMENTS

Patent Document

Patent Document 1; Unexamined Patent Application Publication JP, 2002-215231, A (FIG. 3, FIG. 4 and FIG. 5)

SUMMARY OF THE INVENTION

Problems to be Solved by the Invention

The method of Patent Document 1 for detecting operation states deals with multivalued sensor data. However, binary digital signals which are frequently used to represent ON and Off of sensors in FA fields have characteristics different from those of multivalued signals. Therefore, in a case where the operation states of facilities utilizing binary digital signals are detected, it is difficult to apply a method such as a monitoring method of Patent Document 1 in which multivalued signals are dealt with.

The present invention is devised to solve the problem mentioned above, and aimed to realize an unsteadiness detection device capable of detecting the operation states of facilities in which the binary digital signals are used.

Solution to Problems

To solve the problem and to achieve the aim, an unsteadiness detection device includes: a model generation unit to generate a normal model for determining operation states of a plurality of facilities on the basis of operation data which are binary digital signals obtained from the facilities in their steady operation states; an expectation value calculation unit to calculate an expectation value of operation data by applying the normal model to past operation data of the facilities; and an unsteadiness detection unit to detect whether or not an operation state of one of the facilities is unsteady by comparing the expectation value of the operation data and a measured value of the operation data.

Advantages of the Invention

Because of having a configuration described above, an unsteadiness detection device according to the present invention is capable of detecting the operation states of facilities in which binary digital signals are used.

BRIEF DESCRIPTION OF THE DRAWINGS

FIG. 5 is an example of a database configuration table of a collection database according to Embodiment 1 of the present invention.

EMBODIMENTS

Figure 1:
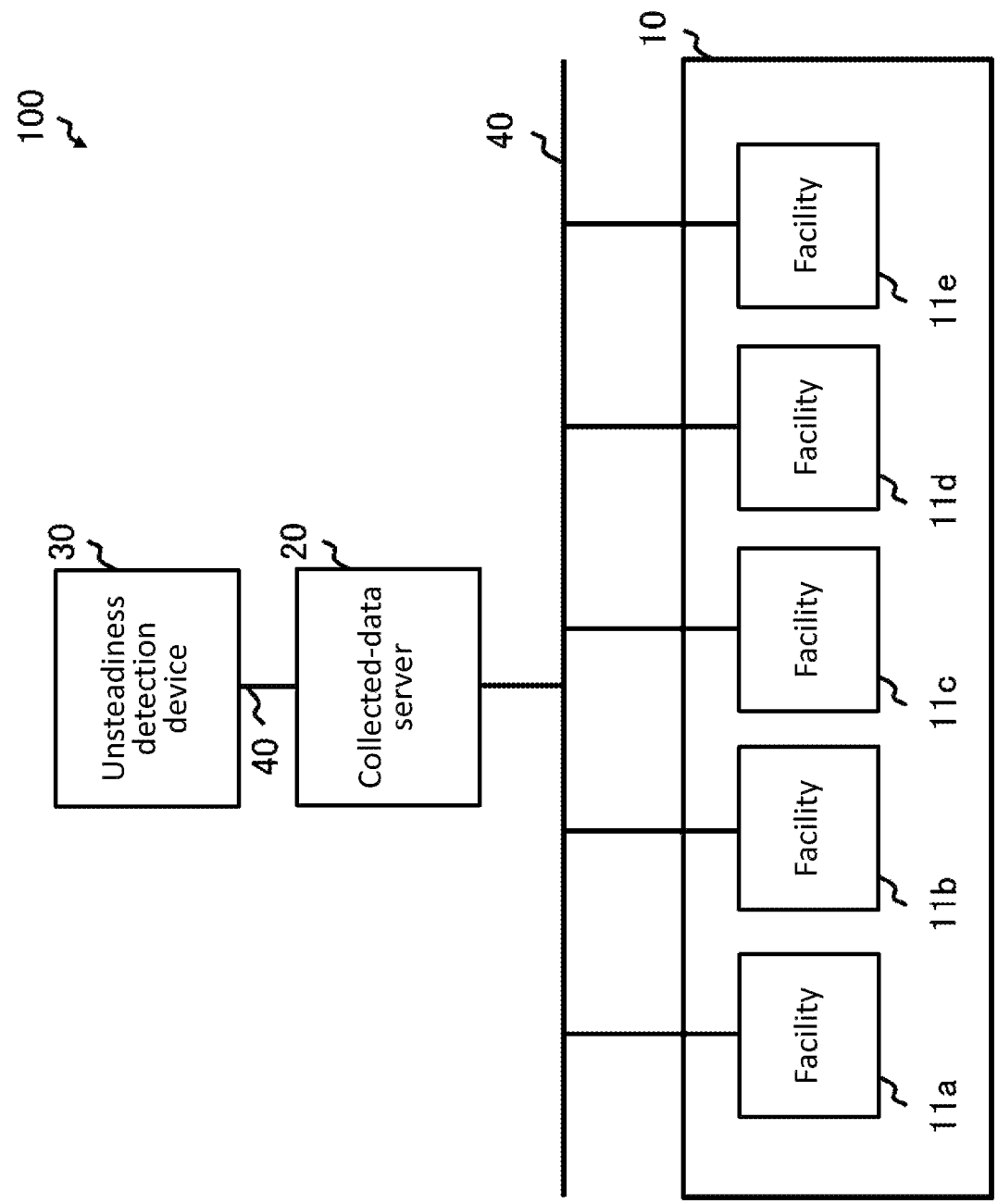
FIG. 1 is a configuration diagram example of an unsteadiness detection system according to Embodiment 1 of the present invention.

Hereinafter, embodiments of an unsteadiness detection device according to the present invention will be described in detail with reference to drawings. In the drawings referred to below, the same symbols are given for the same or equivalent parts. Note, however, the scope of the present invention is not limited to these embodiments.

Embodiment 1

FIG. 1 is a configuration diagram example of an unsteadiness detection system according to Embodiment 1 of the present invention. As shown in FIG. 1, the unsteadiness detection system 100 includes a factory line 10 including five facilities 11 (11a to 11e), a collected-data server 20, an unsteadiness detection device 30 and a network 40.

Each facility 11 is a processing device such as an injection molder, an extruder, a lathe and a grinder, or a control device such as a servo amplifier and a programmable logic controller (PLC), and the facility includes a component such as a switch, a relay, a sensor or a digital circuit to output a binary digital signal, and is controlled by binary digital signals.

The collected-data server 20 includes a storage unit and obtains operation data as binary digital signals from the five facilities 11 connected in the factory line 10, to accumulate them in storage unit. The operation data include opening/closing information of switches or relays, detection information of sensors and output values of digital circuits. Note here that the operation data include data each distinguishable in accordance with the components included in each facility 11 outputting binary digital signals. A single facility 11 may output a plurality of kinds of operation data.

The unsteadiness detection device 30 obtains binary digital signals being the operation data of the facility 11 from the collected-data server 20 and detects on the basis of the obtained binary digital signals whether or not the operation state of the facility 11 is unsteady. Here, when a facility 11 is operating normally, the operation state of the facility 11 is referred to as a steady state; and when the operation of a facility 11 is out of the normal state, the operation state of the facility 11 is referred to as an unsteady state. How the unsteadiness detection device 30 detects unsteadiness will be described later.

The network 40 is a network connecting the factory line 10, the collected-data server 20, the collected-data server 20, and the unsteadiness detection device 30. The network 40 is, for example, a wired network having a transmission line such as a coaxial cable or an optical cable, or the network 40 is a wireless network using a wireless LAN such as Wi-Fi (registered trademark). The networked devices can transmit and receive data with each other.

Figure 2:
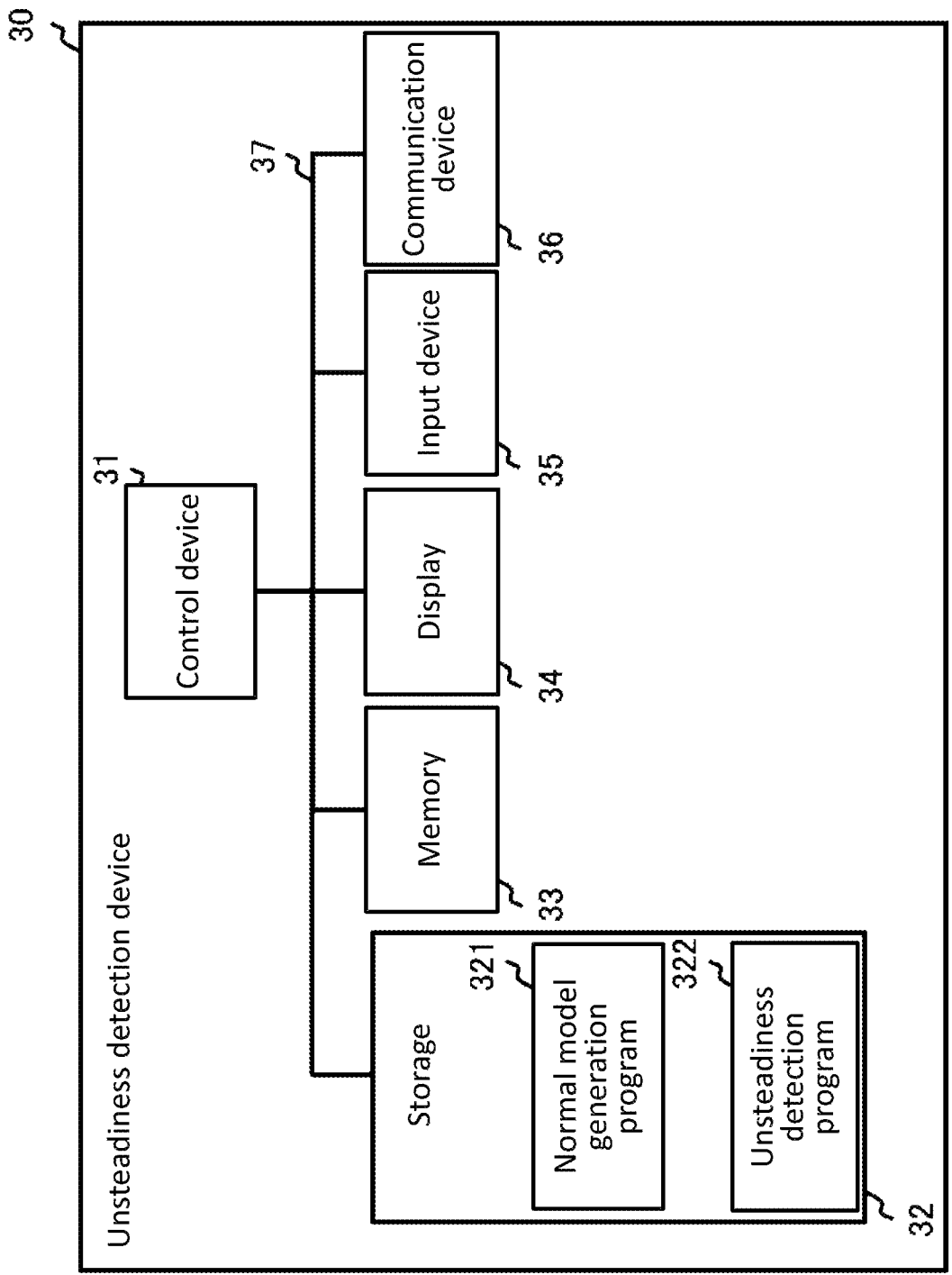
FIG. 2 is a configuration diagram example of an unsteadiness detection device according to Embodiment 1 of the present invention.

FIG. 2 is a configuration diagram example of the unsteadiness detection device according to Embodiment 1 of the present invention. As shown in FIG. 2, the unsteadiness detection device 30 includes a control device 31, a storage 32, a memory 33, a display 34, an input device 35, a communication device 36 and a bus 37.

The control device 31 controls the unsteadiness detection device 30 and also controls the storage 32, the memory 33, the display 34, the input device 35 and the communication device 36 to detect whether or not the operation state of each facility 11 is unsteady. How the control device 31 detects an unsteady state of the facility 11 will be described later in detail. The control device 31 may be a processor such as a central processing unit (CPU), an integrated circuit such as a field programmable gate array (FPGA) or a large-scale integrated circuit (LSI), or a combination thereof.

The storage 32 stores various programs to be executed by the control device 31, data to be referred to by the control device 31 when it executes the programs, and the resultant data to be generated when the control device 31 executes the programs. In Embodiment 1 of the present invention, stored programs are: a normal model generation program 321 which generates a normal model with which the control device 31 determines the operation state of each facility 11; and an unsteadiness detection program 322 with which the control device 31 detects whether the operation state of each facility 11 is unsteady. For the storage 32, for example, a flash memory, a read only memory (ROM), a magnetic disk or a nonvolatile memory such as an optical disc is used.

The memory 33 is a storage which the control device 31 directly accesses when it executes the programs, and the programs and the data stored in the storage 32 are copied to and temporarily stored in the memory. For the memory 33, a volatile memory such as a random access memory (RAM) is used.

The display 34 shows a picture or a motion video in accordance with instructions from the control device 31. For example, a liquid crystal display (LCD) or an organic electroluminescence display (organic EL display) is used for the display 34.

The input device 35 receives inputs from the user, and the input device includes, for example, a key board, a mouse and a touch pad.

Although the display 34 and the input device 35 are described as separate devices, the configuration thereof is not limited to the separate devices as the display 34 and the input device 35. Alternatively, they may be a device such as a touch panel into which the display 34 and the input device 35 are integrated.

The communication device 36 is equipped with a receiver for receiving data and a transmitter for transmitting data, to communicate with outside devices. Through the communication device 36, the control device 31 obtains the operation data of the facilities 11 from the collected-data server 20. The communication device 36 is, for example, a communication chip or a network interface card (NIC).

The bus 37 is a data transmission path through which data are sent and received among the control device 31, the storage 32, the memory 33, the display 34, the input device 35 and the communication device 36. The bus 37 is, for example, a peripheral component interconnect bus (PCI bus) or a PCI Express (registered trademark).

Next, how the control device 31 detects an unsteady state of each facility 11 will be described. The control system 31 performs two kinds of processing in order to detect an unsteady state of a facility 11. One is a normal model generation processing and the other is an unsteadiness detection processing. The normal model generation processing generates a normal model for judging the operation states of the facilities 11. The generation is based on operation data of the facilities 11 during their normal operation states. The unsteadiness detection processing determines whether the operation state of the facility 11 is unsteady or not. The determination is performed by comparing the normal model with operation data of the facility 11. In addition, the two kinds of processing are performed when the control device 31 executes the normal model generation program 321 and the unsteadiness detection program 322 which are stored in the storage 32.

Figure 3:
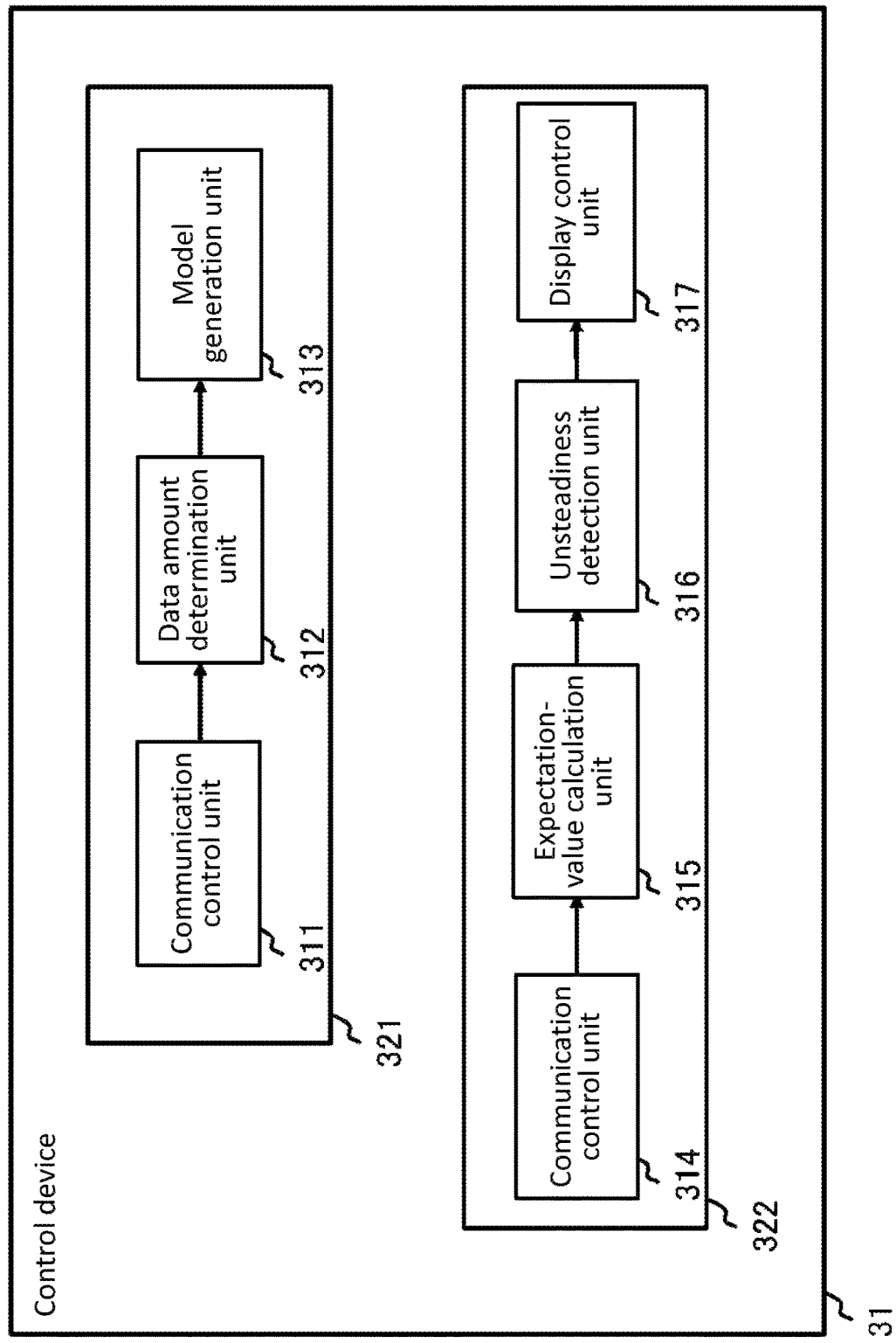
FIG. 3 is a functional configuration diagram example of a control device according to Embodiment 1 of the present invention.

FIG. 3 is a functional configuration diagram example of the control device according to Embodiment 1 of the present invention. FIG. 3 shows the function blocks of the normal model generation program 321 and the unsteadiness detection program 322 which are to be executed by the control device 31. The control device 31 includes a communication control unit 311, a data-amount determination unit 312 and a model generation unit 313 when the normal model generation program 321 is executed. The control device 31 includes a communication control unit 314, an expectation-value calculation unit 315, an unsteadiness detection unit 316 and a display control unit 317 when the unsteadiness detection program 322 is executed. The function blocks of the control device 31 are the communication control unit 311, the data-amount determination unit 312, the model generation unit 313, the communication control unit 314, the expectation-value calculation unit 315, the unsteadiness detection unit 316 and the display control unit 317, whose details will be described later.

First, the normal model generation processing will be described. The normal model generation processing is performed in cases when the operation state of a facility 11 is steady and it becomes necessary to generate a normal model. The cases include: a case where the unsteadiness detection system 100 is introduced; a case where a new facility 11 is added to the factory line 10; and a case where the control condition of an existing facility 11 is changed.

Figure 4:
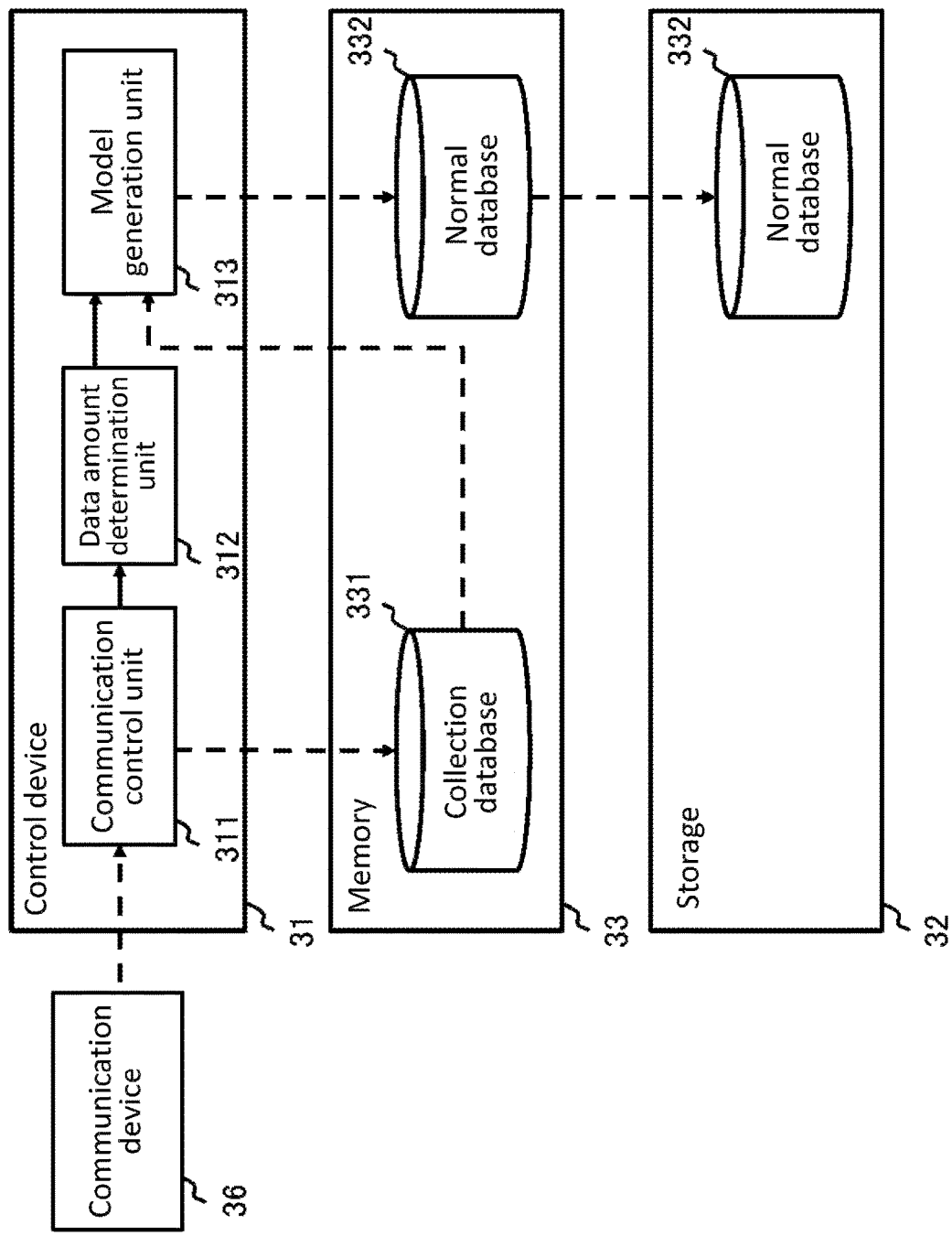
FIG. 4 is a functional configuration diagram example of a normal model generation processing according to Embodiment 1 of the present invention.

FIG. 4 is a functional configuration diagram example of the normal model generation processing according to Embodiment 1 of the present invention. FIG. 4 shows individual functions of the normal model generation program 321 to be executed by the control device 31, as function blocks. Their calling relations are indicated by solid arrows, and data flows are indicated by broken arrows.

As shown in FIG. 4, the control device 31 includes the communication control unit 311, the data-amount determination unit 312 and the model generation unit 313. For description purposes, the storage 32, the memory 33 and the communication device 36 are illustrated in FIG. 4. The storage 32 includes a normal database 332 which is a database to be generated when the control device 31 performs the normal model generation processing. The memory 33 includes a collection database 331 and a normal database 332 which are databases to be generated when the control device 31 performs the normal model generation processing.

The communication control unit 311 obtains the operation data of the facilities 11, being binary digital data, from the collected-data server 20 via the communication device 36 and stores the obtained operation data in the memory 33 as the collection database 331. In the collection database 331, the operation data of the facilities 11 are stored as time-series binary digital signals. A series of processing on the operation data to be performed by the communication control unit 311 may be performed every time when the operation data of the targeted facility 11 is added to the collected-data server 20 or may be performed periodically at a certain time interval.

FIG. 5 is an example of a database configuration table of a collection database according to Embodiment 1 of the present invention. As shown in FIG. 5, in the collection database 331, each of the facilities 11 has two kinds of signals, i.e. a signal 1 and a signal 2, as their operation data. The signal values of the signal 1 and signal 2 are stored in association with time information for each facility 11. In FIG. 5, the operation data of each facility 11 are described as the two kinds of signals, i.e. the signal 1 and signal 2. However, the kinds of the operation data may be one, or three or more. Also, in FIG. 5, the operation data are stored in association with respective signal names. The storage method is not limited to that in association with respective signal names; instead, the operation data may be stored in association with the names of the signal-outputting components of each facility 11 such as a switch, a relay and a sensor, or in association with user-defined names inputted by the user via the input device 35.

Referring back to FIG. 4, the data-amount determination unit 312 determines whether or not the operation data stored in the collection database 331 of the memory 33 meets a required amount. Any method may be used for the method for the data-amount determination unit 312 to determine whether or not the stored data meets the required amount. For example, the data-amount determination unit 312 may measure the amount of data stored in the collection database 331 and determine, when the measured amount exceeds a threshold, that the stored data meets the required amount. Alternatively, the data-amount determination unit may measure a time elapsing from the time when starting storing data in the collection database 331, and determine, when the measured time exceeds a certain time length, that the stored data meets the required amount. The required data amount to be stored in the collection database 331 depends on the factory line 10 composed by the facilities 11, and corresponds to a data amount varying from an amount collected for several hours to that collected for several weeks.

Upon receiving, from the data-amount determination unit 312, a determination result that the data stored in the collection database 331 meets the required amount, the model generation unit 313 obtains, from the collection database 331, time series binary digital signals being the operation data and generates a normal model from the time series binary digital signals obtained. The model generation unit 313 performs machine learning on the time series binary digital signals obtained for each operation data as the normal time series signal pattern of its operation data and generates a learning model being a normal model with which the expectation values of the signals of the operation data to be next outputted are calculated. For the machine learning method used in the model generation unit 313, a machine learning method that can deal with time-series data is utilized. Examples of the machine learning method are a hidden Markov model shown in a patent document (Unexamined Patent Application Publication JP, 2012-48405,A), a time delay neural network, and a recurrent neural network.

The facilities 11 compose the factory line 10, so that the operation state of a facility 11 affects the operation states of other facilities 11; for example, when the power supply of the facility 11a is turned off, the power supply of the facility 11b is turned on. Another example is that when the signal 1 of the facility 11a is turned off, the signal 2 of the facility 11a is also turned off. Thus, the operation state of a component of the facility 11 also affects the operation states of other components. In this way, the operation states of the facilities 11 affect each other, and the operation states of the components in each facility 11 affect each other, whereby the operation state of each component in a facility 11 is determined. Therefore, time-series operation data showing the operation states of the components reflects the operation state of the factory line 10. Thus, by performing machine learning on normal signal patterns of operation data, the model generation unit 313 can generate a proper normal model.

It has been described that the model generation unit 313 performs machine learning individually on each operation data to generate a normal model. The method for generating a normal model, however, is not limited to the method in which the model generation unit 313 performs machine learning individually on each operation data. Instead, the model generation unit 313 can perform machine learning to generate a normal model for operation data that are associated with each other in each facility 11, or in each factory line 10. By using a normal model that the model generation unit 313 generates for operation data associated with each other in each facility 11 or in each factory line 11, it is possible to collectively calculate the expectation values of the operation data in each facility 11 or in each factory line 10.

In the conventional learning model, the signal value of the operation data to be next outputted from the facility 11 is obtained as a binary digital signal value of either zero or one which is to be taken as an actually measured value. On the other hand, in the normal model of Embodiment 1 of the present invention, the expectation value of the actually measured value is obtained. An expectation value to be calculated in Embodiment 1 of the present invention differs from a signal value obtained in the conventional learning model and sometimes takes a value other than zero or one, which cannot be not taken as an actually measured value by the signal value of the operation data to be next outputted from the facility 11. This makes it possible to virtually deal with operation data being a binary digital signal as data taking three or more values, and also makes it possible to perform a more detailed processing in the unsteadiness detection processing of the control device 31, which will be described later.

In the normal database 332 of the memory 33, the model generation unit 313 stores the generated normal model and parameters defining the normal model, which include the number of middle layers, weights and bias values in a case of a recurrent neural network, for example.

The normal database 332 in the memory 33 is copied to and stored in the storage 32 when the normal model generation processing is completed or when the power supply of the unsteadiness detection device 30 is turned off.

Figure 6:
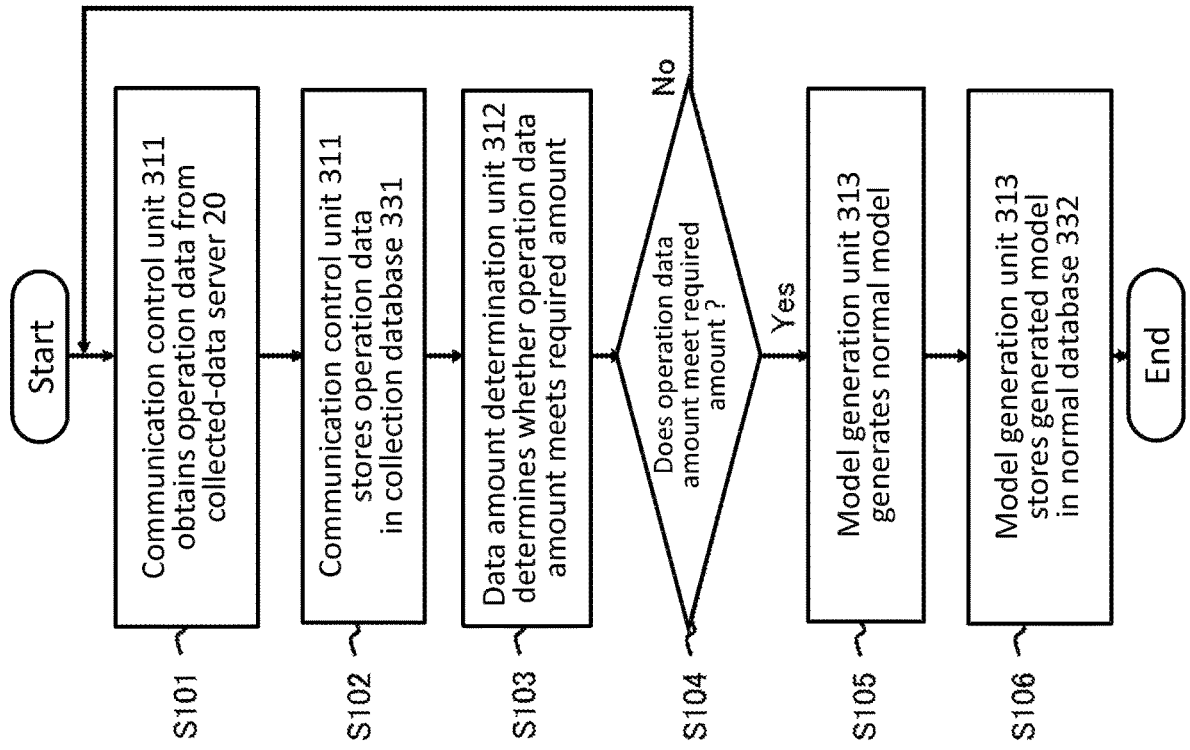
FIG. 6 is a flow chart example of the normal model generation processing according to Embodiment 1 of the present invention.

Next, the flow of the normal model generation processing of the control device 31 will be described. FIG. 6 is a flow chart example of the normal model generation processing according to Embodiment 1 of the present invention.

First, the normal model generation processing is started in response to a user's request or an automatic request from the control device 31. The method to be used for the user to request the processing's start may be freely chosen. The method's examples include: a method in which the unsteadiness detection device 30 has a button as an input device 35 for starting the normal model generation processing and the user presses down the button; and a method in which the unsteadiness detection device 30 has a button displayed on the screen of the display 34, as an input device 35, for starting the normal model generation processing and the user chooses the button. Also, the method to be used for the control device 31 to automatically request the processing's start may be freely chosen. The method's examples include: a method in which the process is started when the unsteadiness detection system 100 is introduced; a method in which the process is started when a new facility 11 is added to the factory line 10; and a method in which the process is started when the control condition of an existing facility 11 is changed.

In step S101, the communication control unit 311 obtains the operation data of a facility 11 from the collected-data server 20 via the communication device 36.

In step S102, the operation data of the facility 11 obtained by the communication control unit 311 in step S101 are stored in the collection database 331 of the memory 33. Then, through step S101 and step S102, the communication control unit 311 copies the operation data of the facility 11 obtained from the collected-data server 20 to the collection database 331.

Next, in step S103, the data-amount determination unit 312 determines whether the operation data stored in the collection database 331 of the memory 33 meets a required amount, and the process proceeds to step S104.

In step S104, on the basis of the determination result obtained by the data-amount determination unit 312 in step S103, the process proceeds to step S101 when the operation data does not meet the required amount (in the case of No), and the process proceeds to step S105 when the operation data meets the required amount (in the case of Yes).

In step S105, the model generation unit 313 generates a normal model from the operation data of the facility 11 stored in the collection database 331.

In step S106, the model generation unit 313 stores the model generated in step S105 and the parameters defining the generated model, in the normal database 332 of the memory 33. Then, the process is ended. The normal database 332 of the memory 33 is copied to and stored in the storage 32 when the normal model generation processing is completed or when the power supply of the unsteadiness detection device 30 is turned off.

Next, the unsteadiness detection processing will be described. After the normal model is generated by the control device 31, the unsteadiness detection processing is always performed in principle when the unsteadiness detection device 30 is in operation, except in cases where it is necessary to generate a new normal model, the cases including a case when a new facility 11 is added to the factory line 10 monitored by the unsteadiness detection system 100 and a case when the control condition of an existing facility 11 is changed.

Figure 7:
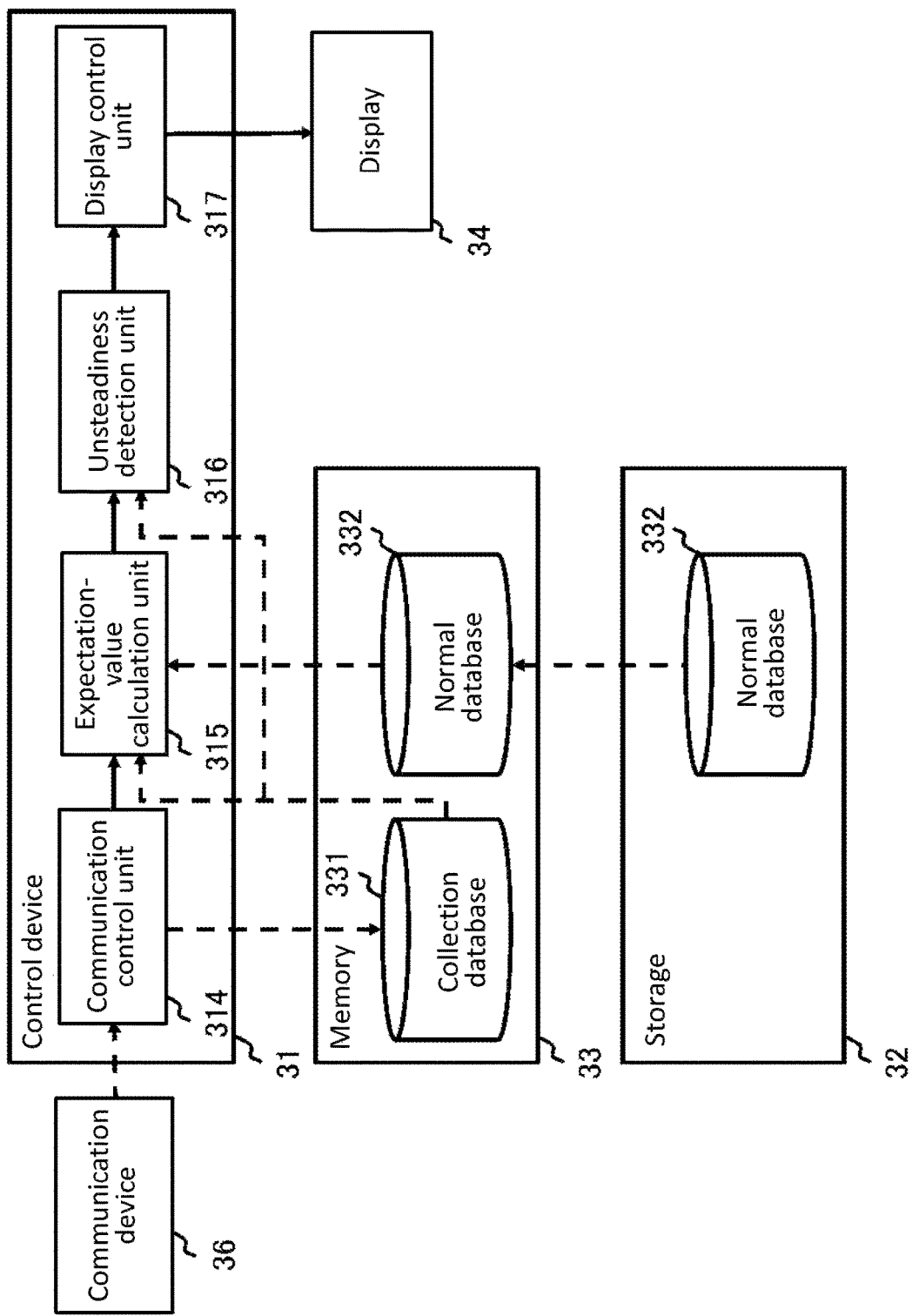
FIG. 7 is a functional configuration diagram example of an unsteadiness detection processing according to Embodiment 1 of the present invention.

FIG. 7 is a functional configuration diagram example of the unsteadiness detection processing according to Embodiment 1 of the present invention. In FIG. 7, the functions of the unsteadiness detection program 322 to be executed by the control device 31 are illustrated as individual function blocks. Their calling relations are indicated by solid arrows and their data flows are indicated by broken arrows.

As shown in FIG. 7, the control device 31 includes the communication control unit 314, the expectation-value calculation unit 315, the unsteadiness detection unit 316 and the display control unit 317. For description purposes, FIG. 7 illustrates the storage 32, the memory 33, the display 34 and the communication device 36. The memory 33 includes the collection database 331 which is a database generated when the control device 31 performs the normal model generation processing. The storage 32 and the memory 33 each include the normal database 332 which is a database generated when the control device 31 performs the normal model generation processing.

Similarly to the operation of the communication control unit 311 in the normal model generation processing, the communication control unit 314 obtains the operation data of the facility 11, being binary digital data, from the collected-data server 20 via the communication device 36 and stores the obtained operation data in the collection database 331 of the memory 33. Here, the operation data of the facility 11 obtained by the communication control unit 314 is different from that obtained by the communication control unit 311 in the normal model generation processing; the communication control unit 314 obtains not only the actually-measured current operation data of the facility 11 but also past operation data of the facility 11 necessary to calculate, using the normal model, the expectation values of signals to be outputted.

The data amount of the past operation data of the facility 11 obtained by the communication control unit 314 depends on the normal model used to calculate the expectation values of the signals. The communication control unit 314 may perform a processing for obtaining the operation data of the current facility 11 every time when the operation data of a target facility 11 are added to the collected-data server 20 or periodically at a certain time interval.

The expectation-value calculation unit 315 obtains the past operation data of the facility 11 from the collection database 331 of the memory 33, obtains the normal model from the normal database 332, and calculates, on the basis of the operation data and the normal model obtained, the expectation values of signal values being the operation data to be next outputted from the facility 11. The normal database 332 of the memory 33 is copied from the storage 32 and stored in the memory 33 when the control device 31 starts the unsteadiness detection processing.

Although each of the operation data of the facility 11 is a binary digital signal, because the normal model is a learning model to calculate the expectation value of the binary signal, the expectation value of the operation data calculated by the expectation-value calculation unit 315 sometimes takes zero, one, or a decimal fraction value between zero and one such as 0.03, 0.50 and 0.99.

Because the operation data is a binary digital signal, the expectation value of the operation data can be, as shown in Formula 1, regarded as the probability ($P_1$) that the actually measured value of the operation data is one. Also, the value ($1-_1$), or one minus the probability $P_1$, is the probability ($P_0$) that the signal value of the operation data is zero.

$$\text{Expectation value} = 0 \times P_0 + 1 \times P_1 \quad \text{[Formula 1]}$$
$$= P_1 \ldots\ldots\ldots [Furmula\ 1]$$

$P0$: Probability that the signal value of the operation data is zero $P1$: Probability that the signal value of the operation data is one The unsteadiness detection unit 316 obtains the expectation values of the operation data calculated by the expectation-value calculation unit 315, and obtains the actually measured values being the operation data of the facility 11 from the collection database 331, to compare the obtained expectation values and the actually measured values and calculate degrees of anomaly of the facility 11. Then, the unsteadiness detection unit 316 detects whether or not the operation state of the facility 11 is unsteady on the basis of the anomaly degrees calculated.
Hereinafter, the specific processing of the unsteadiness detection unit 316 will be described.

First, the unsteadiness detection unit 316 calculates the anomaly degree of each operation data. When the actually measured value of the operation data obtained by the unsteadiness detection unit 316 is one, the unsteadiness detection unit 316 derives ($-\ln(P_1)$), i.e. the negative value of the natural logarithm of the probability $P_1$, which is the probability for the actually measured value of the operation data to be one, as the degree of anomaly.

When the actually measured value of the operation data obtained by the unsteadiness detection unit 316 is zero, the unsteadiness detection unit 316 derives ($-\ln(1-P_1)$), i.e. the negative value of the natural logarithm of the probability $1-P_1$, which is the provability for the actually measured value of the operation data to be zero, as the degree of anomaly.

Figure 8:
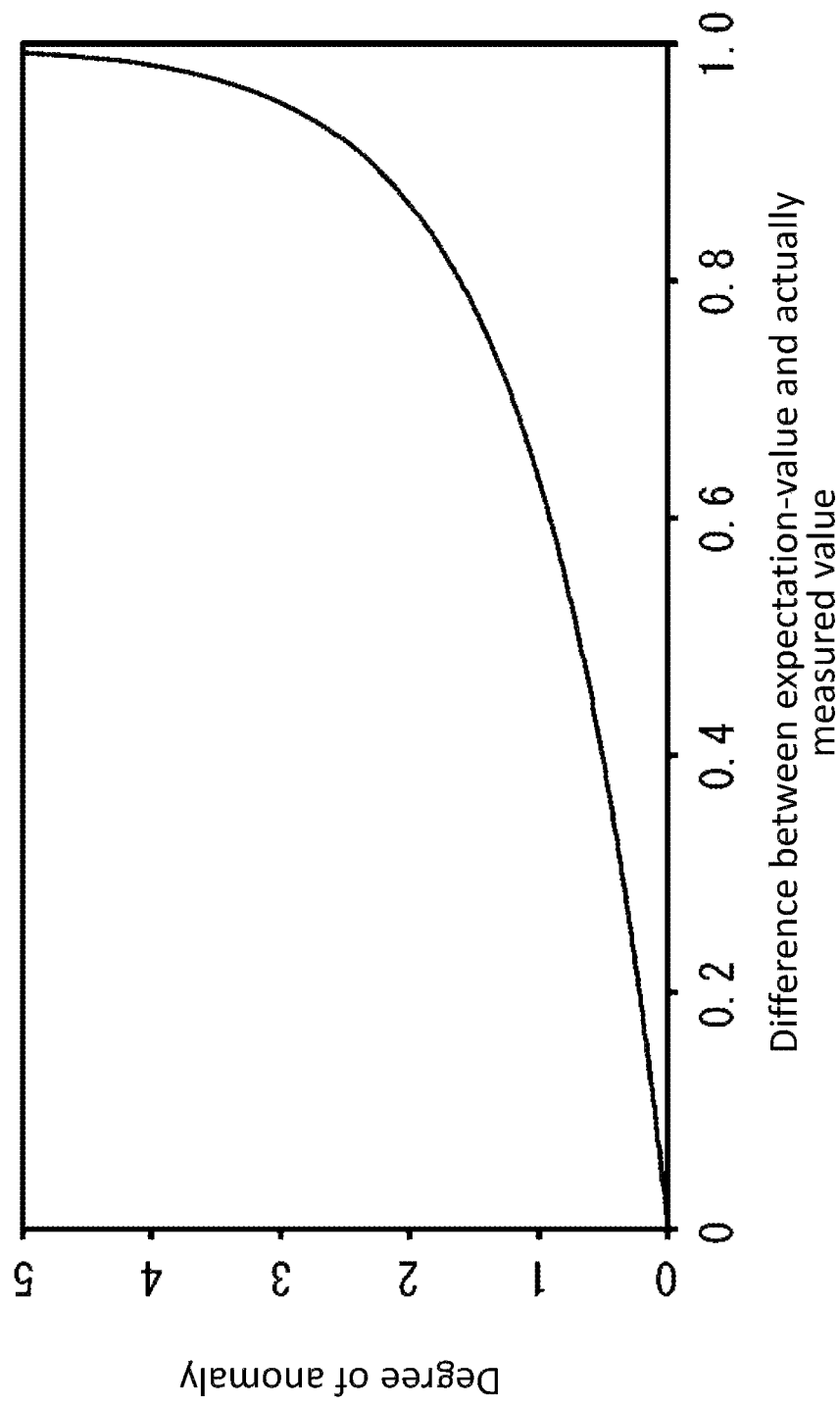
FIG. 8 is a graph illustrating a relation of the degree of anomaly of operation data and the difference value between the expectation value and actually measured value of the operation data according to Embodiment 1 of the present invention.

FIG. 8 is a graph illustrating a relation of the degree of anomaly of operation data and the difference value between the expectation value and actually measured value of the operation data according to Embodiment 1 of the present invention.

As shown in FIG. 8, as the difference, i.e. the deviation between the expectation value and the actually measured value of the operation data, increases, the anomaly degree increases significantly. Therefore, when there is a large deviation between the expectation value and the actually measured value, for example, when the expectation value of the operation data is zero and the actually measured value thereof is one, the anomaly degree becomes extremely high.

Next, the unsteadiness detection unit 316 calculates the anomaly degree for the entire facility 11. The unsteadiness detection unit 316 calculates the anomaly degree of each operation data of a facility 11, whose anomaly degree is to be calculated, and then the unsteadiness detection unit 316 totals the calculated anomaly degrees to obtain the anomaly degree of the facility 11.

Then, the unsteadiness detection unit 316 checks whether or not the total value of the calculated anomaly degrees of the facility 11 exceeds a threshold. When the total value of the anomaly degrees exceeds the threshold, the unsteadiness detection unit 316 determines that the operation state of the facility 11 is unsteady.

Thus, determination on whether the operation state of a facility 11 is unsteady is conducted on the basis of the total value of the anomaly degrees calculated from its operation data. This makes it possible to determine the operation state of the facility 11 in a case where individual anomaly degrees of the operation data are not high but the anomaly degree of the entire facility 11 is high. This is effective for suitably detecting that the operation state of the facility 11 is unsteady.

As the calculation method for obtaining the anomaly degree of each operation data in the unsteadiness detection unit 316, a method using the negative value of natural logarithm was described. The method, however, is not limited to a method that uses the natural logarithm. Any method can be used in which an anomaly degree becomes significantly high as the difference between the expectation value and the actually measured value of the operation data increases. Such methods include a method to use a common logarithm, a method to use an inverse trigonometric function such as an arc tangent, and a method to use an exponential function with a base value of, for example, ten.

As a method for calculating anomaly degrees in the unsteadiness detection unit 316, a method for calculating anomaly degrees of each facility 11 has been described. The method, however, is not limited to a method of calculating the anomaly degree of each facility 11. For example, the method may be a method where the anomaly degrees are calculated for groups into which the parts of each facility 11 are defined by the user according to their functions or related components, or a method where the anomaly degrees are calculated for each group including a plurality of facilities 11 such as a factory line 10.

Referring back to FIG. 7, the display control unit 317 controls the contents on the display 34 in accordance with the detected result of the operation state of the facility 11 obtained from the unsteadiness detection unit 316. When the unsteadiness detection unit 316 detects that the operation state of the facility 11 is not unsteady, the display control unit 317 shows on the display 34 that the facility 11 is steady; when the unsteadiness detection unit 316 detects that the operation state of the facility 11 is unsteady, the display control unit shows on the display that the facility 11 is unsteady.

Figure 9:
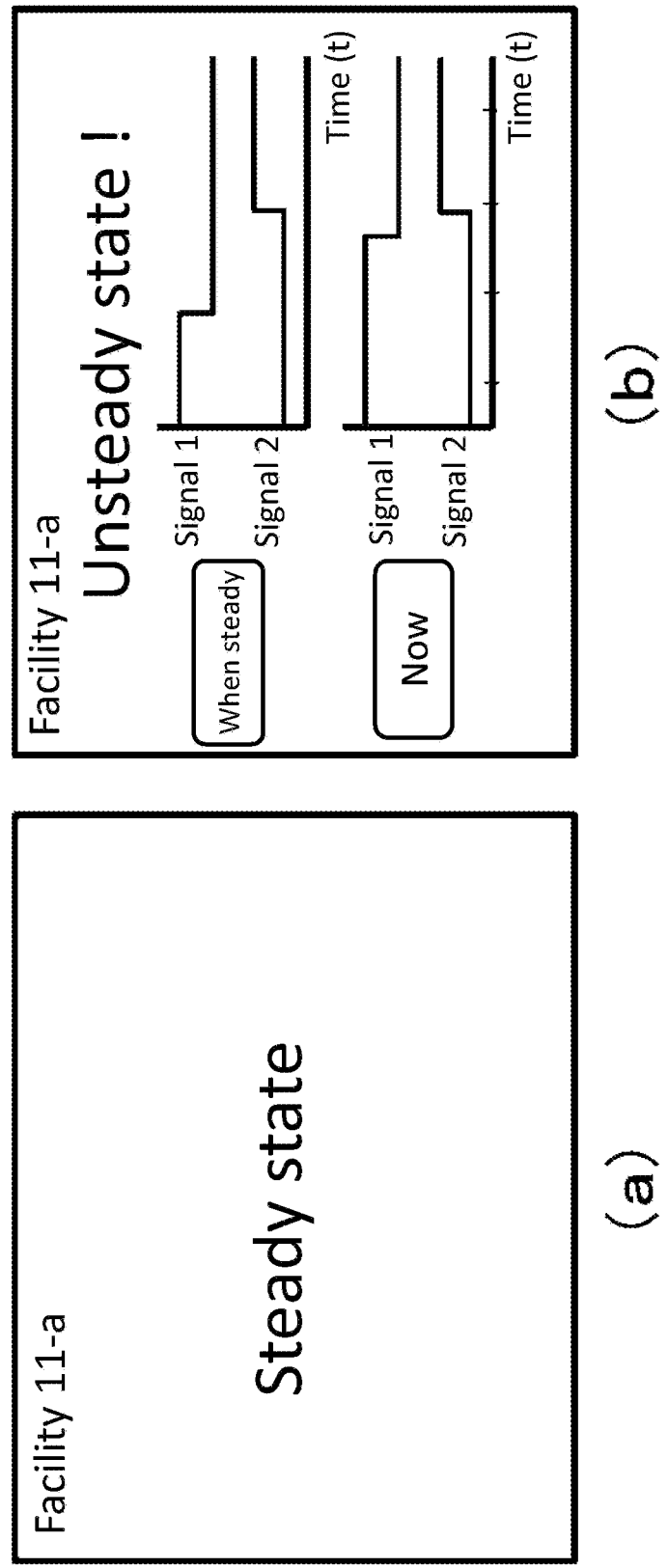
FIG. 9 are examples of pictures on a display according to Embodiment 1 of the present invention.

FIG. 9 are examples of pictures on a display according to Embodiment 1 of the present invention. FIG. 9(a) is a steady-state picture indicating that the operation state of the facility 11 is steady. FIG. 9(b) is an unsteady-state picture indicating that the operation state of the facility 11 is unsteady.

As shown in FIG. 9(a), when the unsteadiness detection unit 316 detects that the operation state of the facility 11 is not unsteady, the display shows the name of the facility 11 at the upper left of its screen and shows in characters that its operation state is steady, at the center thereof.

On the other hand, as shown in FIG. 9(b), when the unsteadiness detection unit 316 detects that the operation state of a facility 11 is unsteady, the display shows the name of the facility 11 at the upper left of its screen, and shows at the upper center thereof that the operation state is unsteady, and the display further shows the name of the operation data of the facility 11 whose operation state becomes unsteady, and the graphs of the time-varying operation data, i.e. the actually measured values in the steady state and the actually measured values in which the unsteady state has been detected. Here, for a displaying purpose, the display control unit 317 converts operation data as follows: the operation data whose expectation value calculated in the expectation-value calculation unit 315 is 0.5 or larger is converted to one; the operation data whose expectation value is smaller than 0.5 is converted to zero.

As shown in FIG. 9, the display 34 shows data according to the detected result obtained by the unsteadiness detection unit 316. This is effective in that the user is notified that an unsteady state is detected in the operation of the facility 11.

The graphs of the time-varying operation data, i.e. the actually measured values, of the steady state and the unsteady state are displayed when it is detected that the operation state of the facility 11 is unsteady. This is effective in that the user can easily recognize that the operation data of the facility 11 become unsteady.

FIG. 9 show, as examples, screen pictures that show the operation state of a single facility 11. However, the screen pictures are not limited to those that show a single facility. Instead, the operation states of all facilities 11 may be displayed on the display screen together at once. In FIG. 9, characters and graphs are used as an example to indicate the operation state of the facility 11 on the display screen. The way for indicating the operation state is not limited to that of using characters and graphs. Any type of expression may be used that can distinguish the unsteady state from the steady state; for example, it is possible to use symbols such as O and X, which mean "good" and "bad".

In FIG. 9, in order to specify the operation data of the facility 11, the name of the operation data expressed in characters is shown as an example on the display screen. However, the way to specify the operation data on the display screen is not limited to those in which the name of the operation data of the facility 11 is expressed in characters. For example, a character set or an illustration may be shown on the display which indicates each of the components of the facility 11 outputting the operation data of the facility 11.

Figure 10:
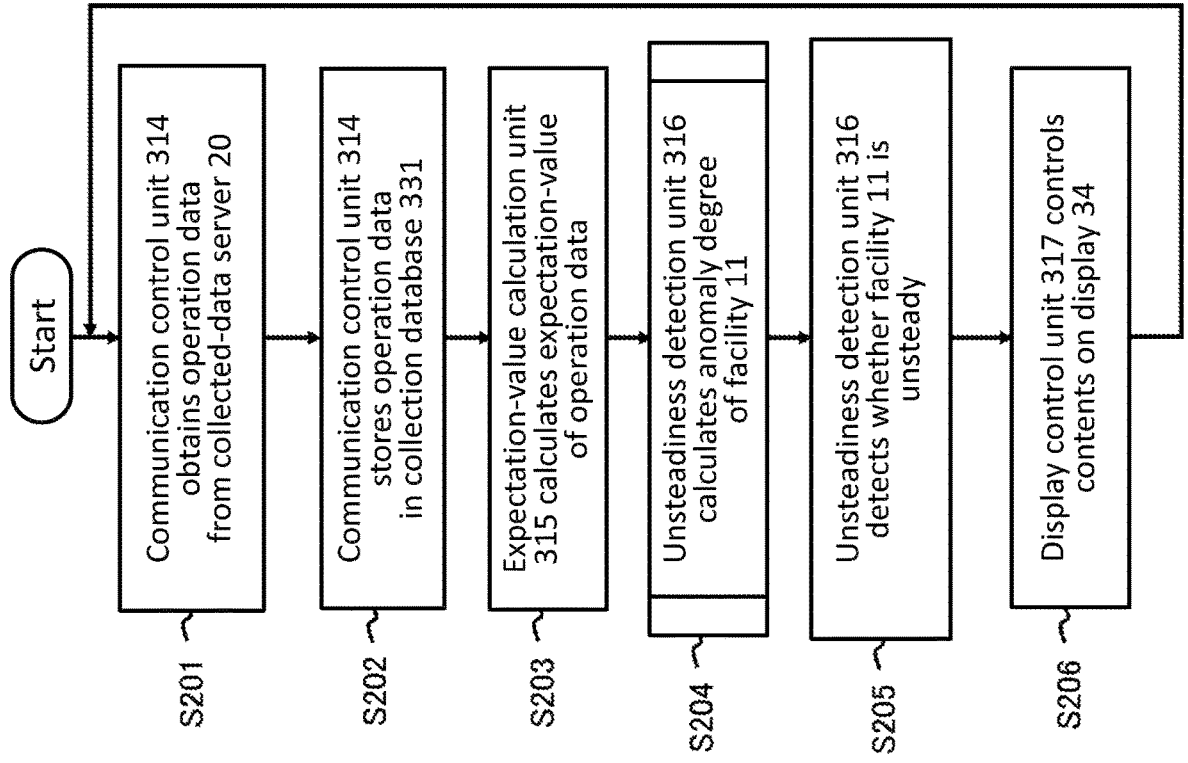
FIG. 10 is a flow chart example of the unsteadiness detection processing according to Embodiment 1 of the present invention.

Next, the flow of the unsteadiness detection processing performed by the control device 31 will be described. FIG. 10 is a flow chart example of the unsteadiness detection processing according to Embodiment 1 of the present invention.

First, after the completion of the normal model generation processing, the control device 31 automatically starts the unsteadiness detection processing. After a normal model is generated by the control device 31, the unsteadiness detection processing is always performed in principle when the unsteadiness detection device 30 is in operation, except cases where it is necessary to generate a new normal model, the cases including a case when a new facility 11 is added to the unsteadiness detection system 100 and a case when the control condition of an existing facility 11 is changed.

In step S201, the communication control unit 314 obtains the operation data of the facility 11 from the collected-data server 20 via the communication device 36. The operation data obtained by the communication control unit 314 includes the past operation data of the facility 11 and the current operation data thereof.

In step S202, the operation data of the facility 11 obtained by the communication control unit 314 in step S201 are stored in the collection database 331 of the memory 33. Then, through step S201 and step S202, the communication control unit 314 copies the operation data of the facility 11 obtained from the collected-data server 20 to the collection database 331.

Next, in step S203, the expectation-value calculation unit 315 calculates the expectation values of the operation data to be outputted next from the facility 11 on the basis of the past operation data of the facility 11 stored in the collection database 331 of the memory 33 and the normal model stored in the normal database 332.

In step S204, the unsteadiness detection unit 316 calculates the anomaly degree of the facility 11 on the basis of the expectation values of the operation data calculated by the expectation-value calculation unit 315 in step S203 and the actually measured values of the operation data of the facility 11 stored in the collection database 331 of the memory 33. The processing flow with which the unsteadiness detection unit 316 calculates the anomaly degree of the facility 11 will be described in detail with reference to FIG. 11.

Figure 11:
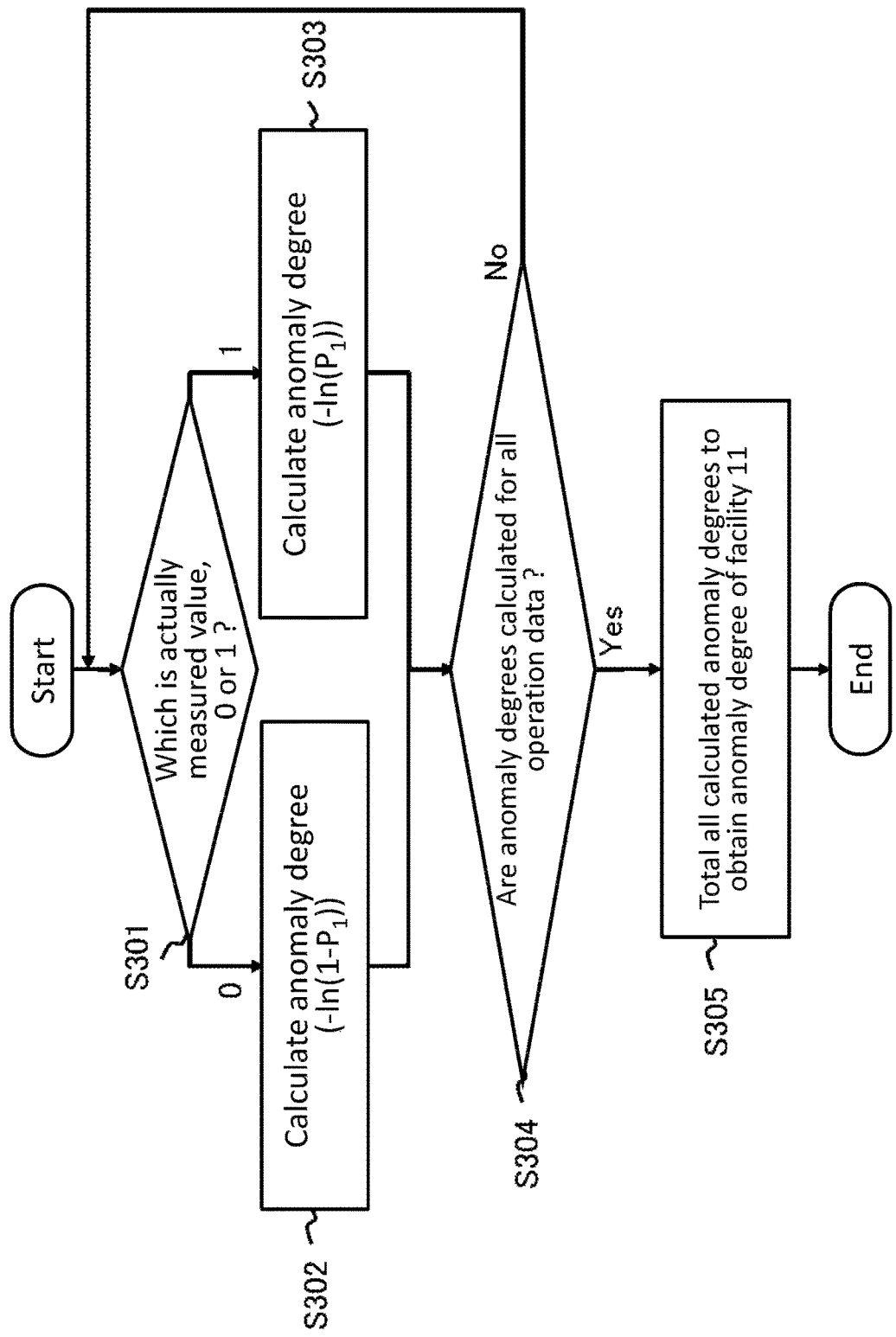
FIG. 11 is a flow chart example of the processing for calculating an anomaly degree according to Embodiment 1 of the present invention.

FIG. 11 is a flow chart example of the processing for calculating an anomaly degree according to Embodiment 1 of the present invention. The processing for calculating anomaly degrees shown in FIG. 11 is all performed by the unsteadiness detection unit 316.

In step S301, the unsteadiness detection unit 316 determines whether the actually measured value of operation data of the facility 11 stored in the collection database 331 of the memory 33 is zero or one. If the actually measured value is zero, the process proceeds to step S302. If the actually measured value is one, the process proceeds to step S303.

In step S302, the unsteadiness detection unit 316 calculates $(-\ln(1-P_1))$, i.e. the negative value of the natural logarithm of the probability $1-P_1$, which is the probability for the actually measured value to be zero, to obtain the anomaly degree. Then, the process proceeds to step S304.

In step S303, the unsteadiness detection unit 316 calculates $(-\ln(1-P_1))$, i.e. the negative value of the natural logarithm of the probability $P_1$, which is the probability for the actually measured value to be one, to obtain the anomaly degree. Then, the process proceeds to step S304.

In step S304, the unsteadiness detection unit 316 determines whether anomaly degree calculations are completed with respect to all operation data of the facility 11 on which anomaly degrees are to be calculated. If all calculations are completed (in the case of Yes), the process proceeds to step S305. If all calculations are not completed yet (in the case of No), the process returns to step S301 to continue the calculation.

In step S305, the unsteadiness detection unit 316 totals the calculated anomaly degrees to obtain the anomaly degree of the facility 11 and then ends the calculation processing of the anomaly degree.

Referring back to FIG. 10, in step S205, the unsteadiness detection unit 316 determines whether or not the anomaly degree of the facility 11 calculated by the unsteadiness detection unit 316 in step S204 exceeds a threshold, to detect whether or not the operation state of the facility 11 is unsteady.

In step S206, the display control unit 317 controls the contents on the display 34 in accordance with the detected result obtained by the unsteadiness detection unit 316 in step S205. Then, the process returns to step S201 to continue the unsteadiness detection processing.

As so far described, the unsteadiness detection device 30 according to Embodiment 1 calculates the expectation values of the signals of the operation data to be outputted next from the past operation data of the facility 11 being binary digital signals, and then calculates the anomaly degree of the operation state of the facility 11 from the calculated expectation values and the actually measured values of the operation data, to detect whether or not the operation state of the facility 11 using the binary digital signals is unsteady. Therefore, the unsteadiness detection device 30 according to Embodiment 1 is effective for detecting an unsteady state of the facility in real time with a reduced amount of processing.

It has been described that the control device 31 continues the unsteadiness detection processing even when it is determined that the operation state of the facility 11 is unsteady. The processing method, however, is not limited to the processing in which the unsteadiness detection processing is continued even when it is determined that the operation state of the facility 11 is unsteady. For example, the unsteadiness detection device 30 may further have a function to stop the factory line 10, and the unsteadiness detection device 30 may stop the factory line 10 and end the unsteadiness detection processing when the unsteadiness detection unit 316 determines that the operation state of the facility 11 is unsteady.

Embodiment 2

In Embodiment 1, a method for detecting the operation state of a facility 11 using binary digital signals was described. In Embodiment 2, another embodiment will be described in which the operation state of the facility 11 is detected and the user is, when the operation state is unsteady, notified of the cause of the detected unsteadiness of the operation state. In addition, the configuration of an unsteadiness detection system 100, the structure of an unsteadiness detection device 30, the structure of a control device 31 of an unsteadiness detection device 30, and the normal model generation processing performed by the control device 31 are the same as those in Embodiment 1, therefore their descriptions will be omitted.

Figure 12:
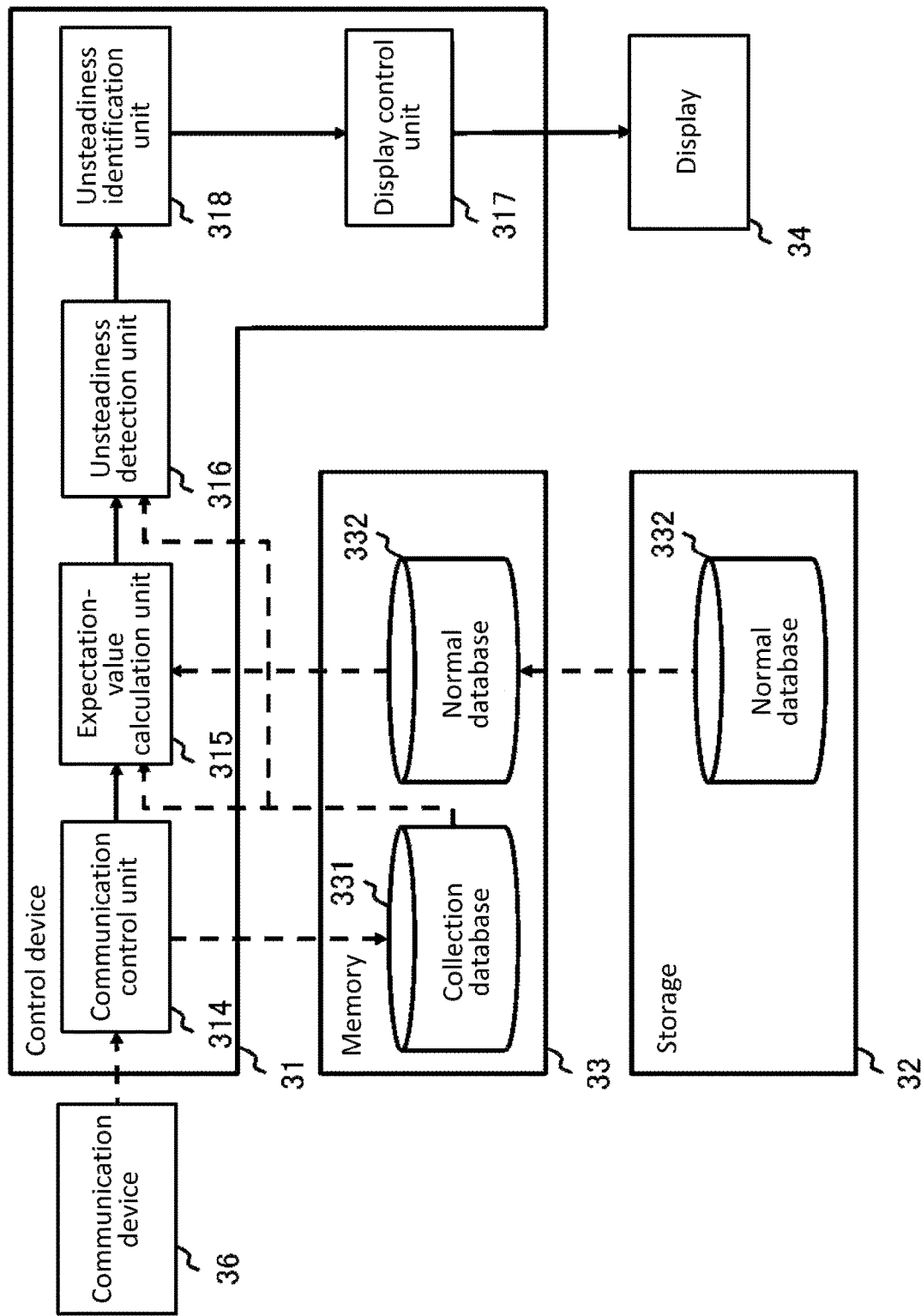
FIG. 12 is a functional configuration diagram example of an unsteadiness detection processing according to Embodiment 2 of the present invention.

FIG. 12 is a functional configuration diagram example of an unsteadiness detection processing according to Embodiment 2 of the present invention. The difference from the functional configuration for performing the unsteadiness detection processing in Embodiment 1 shown in FIG. 7 is that the control device 31 further includes an unsteadiness identification unit 318.

When the operation state of the facility 11 is unsteady, the unsteadiness identification unit 318 identifies the cause of the unsteadiness. From the unsteadiness detection unit 316, the unsteadiness identification unit 318 obtains the detected result of the operation state of the facility 11; when the operation state of the facility 11 is unsteady, the unsteadiness identification unit further obtains the individually calculated anomaly degrees of the operation data.

When the obtained detected-result of the operation state of the facility 11 indicates that the facility is not unsteady, the unsteadiness identification unit 318 transmits the obtained detected-result of the operation state of the facility 11 to the display control unit 317.

When the obtained detected-result of the operation state of the facility 11 indicates that the facility is unsteady, the unsteadiness identification unit 318 identifies a cause of the unsteadiness of the operation state of the facility 11 on the basis of the obtained individual anomaly degrees of the operation data and transmits the obtained detected-result of the operation state of the facility 11 and the identified cause to the display control unit 317. One of the possible way for the unsteadiness identification unit 318 to identify the cause of the unsteadiness is to identify operation data having the largest anomaly degree among the anomaly degrees obtained by the unsteadiness identification unit 318 as the cause of the unsteadiness. Another way therefor is to recognize operation data each having an anomaly degree being high in ranking among the obtained anomaly degrees as the cause of the unsteadiness. Another way therefor is to recognize operation data having an anomaly degree higher than a threshold as the cause of the unsteadiness.

Referring back to FIG. 12, the display control unit 317 controls the contents on the display 34 in accordance with the detected result and the cause of the unsteadiness of the facility 11 which have been obtained from the unsteadiness identification unit 318. When the obtained detected-result of the operation state of the facility 11 indicates that the facility is not unsteady, the display control unit 317 displays on the display 34 that the facility 11 is steady; and when the obtained detected-result of the operation state of the facility 11 indicates that the facility is unsteady, the display control unit displays on the display that the facility 11 is unsteady.

Figure 13:
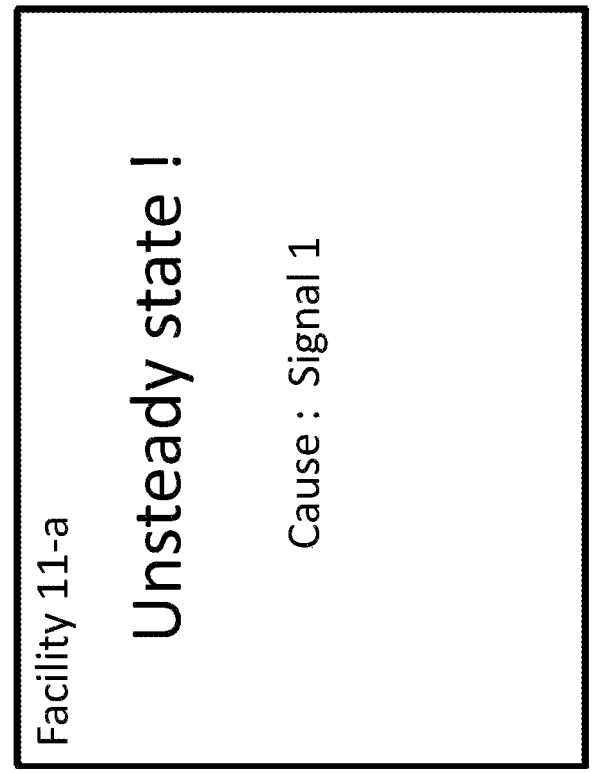
FIG. 13 are examples of pictures indicating an unsteady state on a display according to Embodiment 2 of the present invention.
Figure 13:
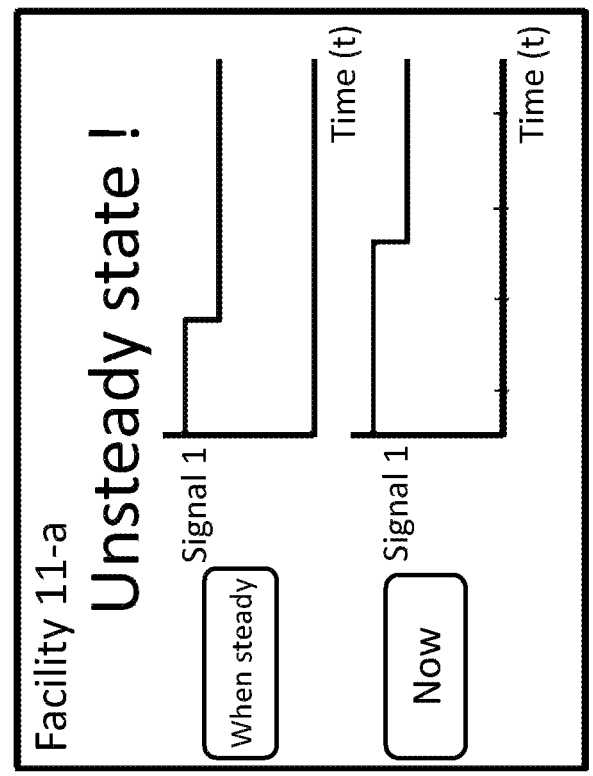

FIG. 13 are picture examples indicating an unsteady state on the display according to Embodiment 2 of the present invention. The picture indicating that the operation state of the facility 11 is steady is the same as a picture shown in FIG. 9(a) which is the steady-state picture in Embodiment 1; therefore, the description of the picture will be omitted.

As shown in the picture example of FIG. 13(a) where an unsteady state is shown on a display in Embodiment 2, the display shows the name of the facility 11 at the upper left and indicates at the upper center that the operation state of the facility 11 is unsteady; the display further shows the name of the operation data of the facility 11 identified as a cause of the unsteadiness and time variation graphs of the operation data being the actually measured values in the steady state and the detected unsteady state. The difference from the unsteady-state picture shown in FIG. 9(b) of Embodiment 1 is that, only the operation data identified as a cause of the unsteadiness is displayed.

As described above, when it is detected that the operation state of the facility 11 is unsteady, time variation graphs are displayed which show the operation data being the actually measured values in the steady state and the detected unsteady state. This is effective for making the user readily recognize that operation data of the facility 11 has become unsteady.

On the other hand, as shown in another picture example in FIG. 13(*b*), when the display indicates an unsteady state in Embodiment 2, the display shows the name of the facility 11 at the upper left and indicates at the upper center that the operation state is unsteady; the display further shows only the name of the operation data of the facility 11 identified as a cause of the unsteadiness in characters, not using a graph.

As described above, when it is detected that the operation state of the facility 11 is unsteady, only the name of the operation data of the facility 11 identified as a cause of the unsteadiness is shown. This is effective for making the user readily recognize a cause of the unsteadiness of the operation state of the facility 11.

As shown in FIG. 13, the display 34 shows data according to the detected result obtained by the unsteadiness detection unit 316. This is effective in that the user is notified that an unsteady state is detected in the operation of the facility 11.

FIG. 13 show example pictures in which only the operation data of the facility 11 identified as a cause of the unsteadiness of the operation state of the facility 11 is displayed. However, the picture contents are not limited to the operation data of the facility 11 identified as a cause of the unsteadiness. Instead, all operation data of the facility 11 may be shown on the display with an indication for each of the operation data showing whether it has been identified as a cause of the unsteadiness.

In order to indicate the operation data of the facility 11 identified as a cause of the unsteadiness of the operation state of the facility 11, the pictures in FIG. 13 show the name of the operation data in characters. However, the way to indicate operation data on the display is not limited to the way in which the name of the operation data of the facility 11 is shown in characters. For example, the component of the facility 11 which has outputted the operation data of the facility 11 identified as a cause may be indicated using characters or an illustration.

Figure 14:
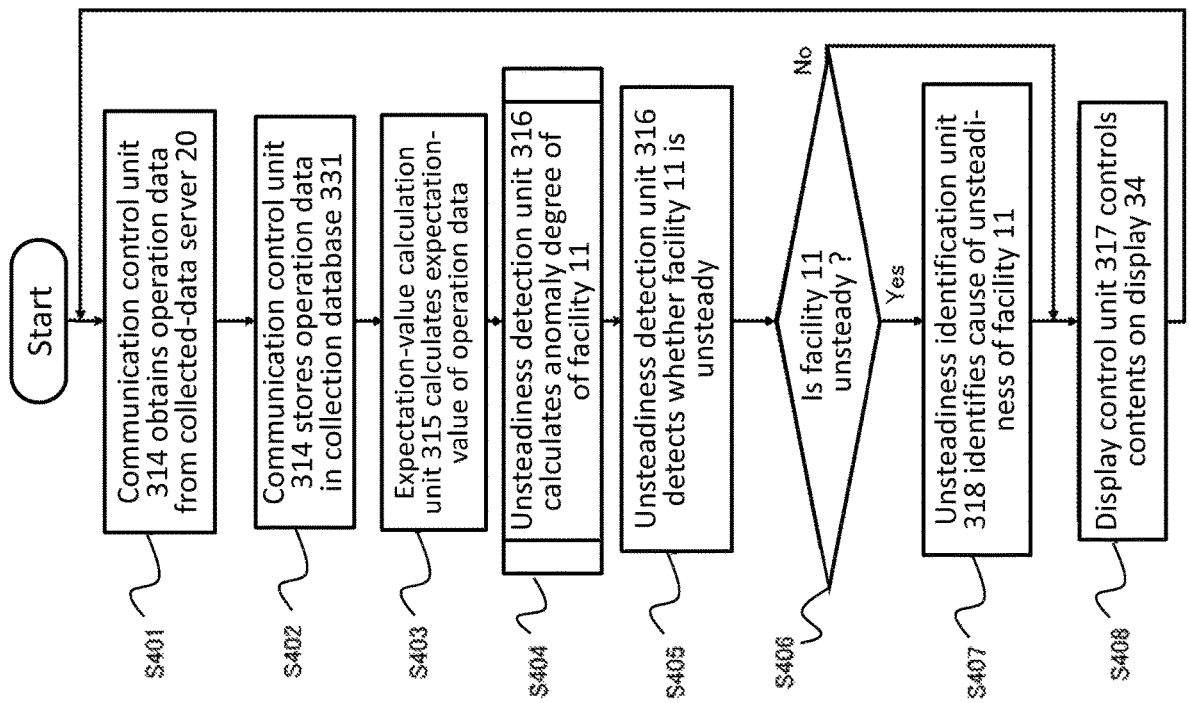
FIG. 14 is a flow chart example showing of the unsteadiness detection processing according to Embodiment 2 of the present invention.

Next, the flow of the unsteadiness detection processing performed by the control device 31 will be described. FIG. 14 is a flow chart example showing of the unsteadiness detection processing according to Embodiment 2 of the present invention.

First, after the completion of the normal model generation processing, the control device 31 automatically starts the unsteadiness detection processing. After a normal model is generated by the control device 31, the unsteadiness detection processing is always performed in principle when the unsteadiness detection device 30 is in operation, except cases where it is necessary to generate a new normal model, the cases including a case when a new facility 11 is added to the unsteadiness detection system 100 and a case when the control condition of an existing facility 11 is changed.

Steps S401 to S405 are the same as steps S201 to S205 of the unsteadiness detection processing according to Embodiment 1 shown in FIG. 10; therefore, their descriptions will be omitted.

In step S406, the unsteadiness identification unit 318 performs its processing in accordance with the result detected in step S405 by the unsteadiness detection unit 316. In a case where the result detected in step S405 by the unsteadiness detection unit 316 indicates that the operation state of the facility 11 is not unsteady (in a case of "No"), the unsteadiness identification unit 318 transmits the result detected in step S405 by the unsteadiness detection unit 316 to the display control unit 317; then, the process proceeds to step S408. In a case where the result detected in step S405 by the unsteadiness detection unit 316 indicates that the operation state of the facility 11 is unsteady (in a case of "Yes"), the process of the unsteadiness identification unit 318 proceeds to step S407.

In step S407, the unsteadiness identification unit 318 identifies a cause of the unsteadiness in the facility 11 on the basis of the anomaly degrees of the facility 11 calculated in step S404 by the unsteadiness detection unit 316 and the result detected in step S405 by the unsteadiness detection unit 316; and then the unsteadiness identification unit transmits to the display control unit 317, the result detected in step S405 by the unsteadiness detection unit 316 and the identified cause of the unsteadiness in the facility 11. Then, the process proceeds to step S408.

In step S408, the display control unit 317 controls the contents on the display 34 in accordance with the result detected in step S405 by the unsteadiness detection unit 316 and the cause of the unsteadiness in the facility 11 identified in step S407 by the unsteadiness identification unit 318. Then, the process returns to step S401 to continue the unsteadiness detection processing.

As described above, when the operation state of the facility 11 becomes unsteady, the unsteadiness detection device 30 according to Embodiment 2 can identify a cause of the unsteadiness to notify the user of the identified cause. This can make the user readily recognize the cause of the unsteadiness in the facilities 11, leading to quickly maintaining the facility 11.

It has been described that the control device 31 continues the unsteadiness detection processing even after it is determined that the operation state of the facility 11 is unsteady. The continuation method of the unsteadiness detection processing, however, is not limited to the method in which the unsteadiness detection processing is continued even after it is determined that the operation state of the facility 11 is unsteady. For example, the unsteadiness detection device 30 may have a function to stop the factory line 10 so that the unsteadiness detection device will stop the factory line 10 and end the unsteadiness detection processing after the unsteadiness detection unit 316 determines that the operation state of the facility 11 is unsteady.

DESCRIPTION OF SYMBOLS

10: factory line, 11: facility, 20: collected-data server, 30: unsteadiness detection device, 31: control device, 311, 314: communication control unit, 312: data-amount determination unit, 313: model generation unit, 315: expectation-value calculation unit, 316: unsteadiness detection unit, 317: display control unit, 318: unsteadiness identification unit, 32: storage, 321: normal model generation program, 322: unsteadiness detection program, 33: memory, 331: collection database, 332: normal database, 34: display, 35: input device, 36: communication device, 37: bus, 40: network, 100: unsteadiness detection system

The invention claimed is:

1. An unsteadiness detection device comprising:
   a processor to execute a program; and
   a memory to store the program which, when executed by the processor, performs processes of
      generating a normal model for determining operation states of a plurality of facilities in a factory on the basis of operation data which are binary digital signals obtained from the facilities in their steady operation states;

obtaining a series of measured values of operation data of each of the plurality of facilities, each of the measured values being of a control signal used for controlling factory equipment in the corresponding facility, each of the measured values being in the form of one or more binary digital signals, each of the series of measured values being in the form of time-series data:

for each of a plurality of the measured values obtained, calculating a corresponding expectation value of operation data by applying the normal model to past measured values of operation data of the facilities;

detecting whether or not an operation state of at least one of the facilities is unsteady by comparing the expectation values of the operation data to the corresponding measured values of the operation data; and in response to detecting that the operation state of at least one of the facilities is unsteady, automatically generating an alarm on a display, the alarm identifying each of the facilities whose operation state is detected to be unsteady.

2. The unsteadiness detection device according to claim 1, wherein in the detecting process, on the basis of each expectation value and the corresponding measured value of the operation data, a degree of anomaly is calculated whose value becomes increasingly large as a difference between the expectation value and the corresponding measured value of the operation data increases, and it is detected whether or not the operation state of at least one of the facilities is unsteady on the basis of the degree of anomaly.

3. The unsteadiness detection device according to claim 2, wherein when one of the measured values of operation data is one, in the detecting process, a negative value of a natural logarithm of the corresponding expectation value of the operation data is calculated as the degree of anomaly, and wherein when one of the measured values of operation data is zero, in the detecting process, a negative value of a natural logarithm of a value that is one minus the corresponding expectation value of the operation data is calculated as the degree of anomaly.

4. The unsteadiness detection device according to claim 2, wherein the program further performs a process of in response to detecting that the operation state of at least one of the facilities is unsteady, identifying a cause of the unsteadiness of each identified facility on the basis of the degree of anomaly obtained by the detecting process.

5. The unsteadiness detection device according to claim 4 further comprising the display to display the alarm and each identified cause of unsteadiness.

6. The unsteadiness detection device according to claim 1, wherein, in the generating process, machine learning is performed to generate the normal model, the machine learning being capable of dealing with the series of measured values of operation data being time series data.

7. The unsteadiness detection device according to claim 1 further comprising the display to display a result obtained by the detecting process, including the alarm when automatically generated.

8. An unsteadiness detection system comprising:
the unsteadiness detection device according to claim 1;
the plurality of facilities; and
a collected-data server to store operation data of the plurality of facilities.

9. An unsteadiness detection device comprising:
a processor to execute a program; and
a memory to store the program which, when executed by the processor, performs processes of generating a normal model for determining operation states of a plurality of facilities on the basis of operation data which are binary digital signals obtained from the facilities in their steady operation states;

calculating an expectation value of operation data by applying the normal model to past operation data of the facilities; and detecting whether or not an operation state of one of the facilities is unsteady by comparing the expectation value of the operation data and a measured value of the operation data wherein the operation data are time series data, and
wherein in the generating process machine learning is performed to generate the normal model, the machine learning capable of dealing with the operation data being time series data, wherein a hidden Markov model, a time delay neural network or a recurrent neural network is used in the machine learning capable of dealing with the time-series data.

10. An unsteadiness detection method comprising:
generating a normal model for determining operation states of a plurality of facilities in a factory on the basis of operation data which are binary digital signals obtained from the facilities in their steady operation states;

obtaining a series of measured values of operation data of each of the plurality of facilities, each of the measured values being of a control signal used for controlling factory equipment in the corresponding facility, each of the measured values being in the form of one or more binary digital signals, each of the series of measured values being in the form of time-series data;

for each of a plurality of the measured values obtained, calculating a corresponding expectation value of operation data by applying the normal model to past measured values of operation data of the facilities;

detecting whether or not an operation state of at least one of the facilities is unsteady by comparing the expectation values of the operation data to the corresponding measured values of the operation data; and in response to detecting that the operation state of at least one of the facilities is unsteady, automatically generating an alarm on a display, the alarm identifying each of the facilities whose operation state is detected to be unsteady.

* * * * *